United States Patent

[11] 3,631,847

[72] Inventor James C. Hobbs, II
    4384 Ingraham Highway, Miami, Fla.
    33133
[21] Appl. No. 810,292
[22] Filed Mar. 25, 1969
[45] Patented Jan. 4, 1972
    Continuation of application Ser. No.
    531,834, Mar. 4, 1966, now abandoned.
    This application Mar. 25, 1969, Ser. No.
    810,292

[54] METHOD AND APPARATUS FOR INJECTING FLUID INTO THE VASCULAR SYSTEM
    24 Claims, 9 Drawing Figs.
[52] U.S. Cl. .................................................. 128/2 R,
    128/218 A
[51] Int. Cl. ..................................................... A61b 6/00,
    A61m 5/00, A61m 5/20
[50] Field of Search ........................................... 128/2, 2.05,
    218 A, 218.2, 218 P, 236, 273; 222/59

[56] References Cited
UNITED STATES PATENTS

| | | | |
|---|---|---|---|
| 2,602,446 | 7/1952 | Glass et al. | 128/218 |
| 2,627,270 | 2/1953 | Glass | 128/218 |
| 2,690,178 | 9/1954 | Bickford | 128/213 |
| 2,896,621 | 7/1959 | Rodriques | 128/218 |
| 3,155,090 | 11/1964 | Holter | 128/218 |
| 3,156,236 | 11/1964 | Williamson | 128/2.05 |
| 3,252,623 | 5/1966 | Corbin et al. | 222/59 |

Primary Examiner—Dalton L. Truluck
Attorney—Watts, Hoffman, Fisher & Heinke

ABSTRACT: A method for use in the study and diagnosis of vascular systems in which liquids of a wide range of viscosities and for various purposes may be injected into such a system at constant predetermined rates and volumes.

Apparatus to inject radiopaque fluid into a vascular system comprising a syringe, a plunger in the syringe, a catheter connecting the syringe to the vascular system, means to move the plunger in the syringe, and means to measure and control the speed of the plunger in the syringe throughout the period of injection.

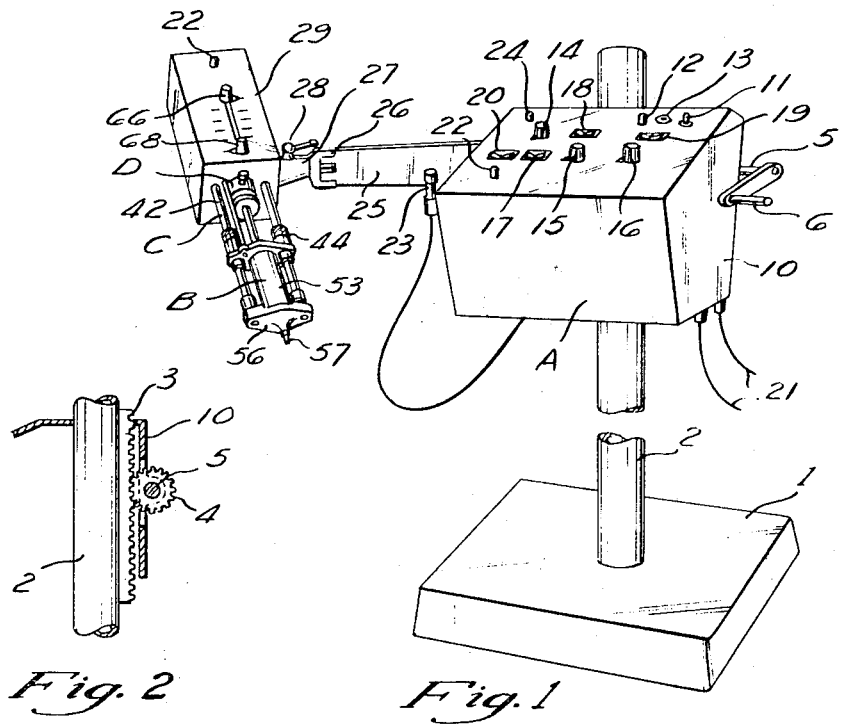
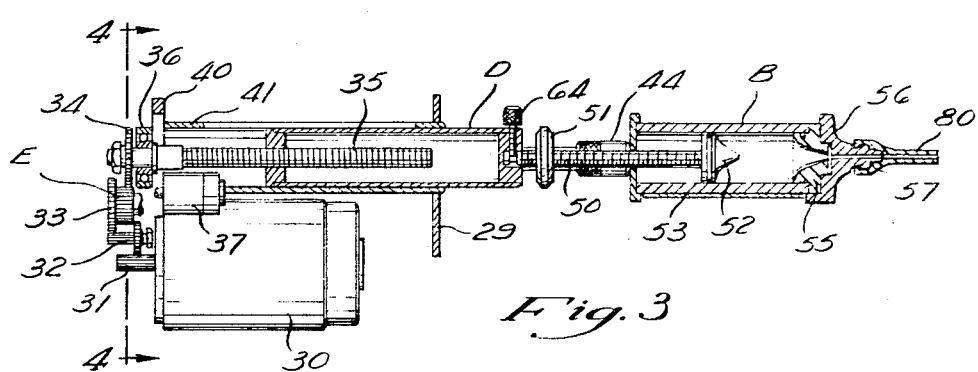
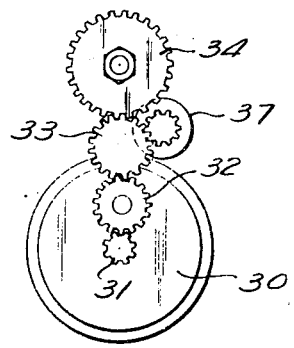
INVENTOR.
JAMES C. HOBBS, II

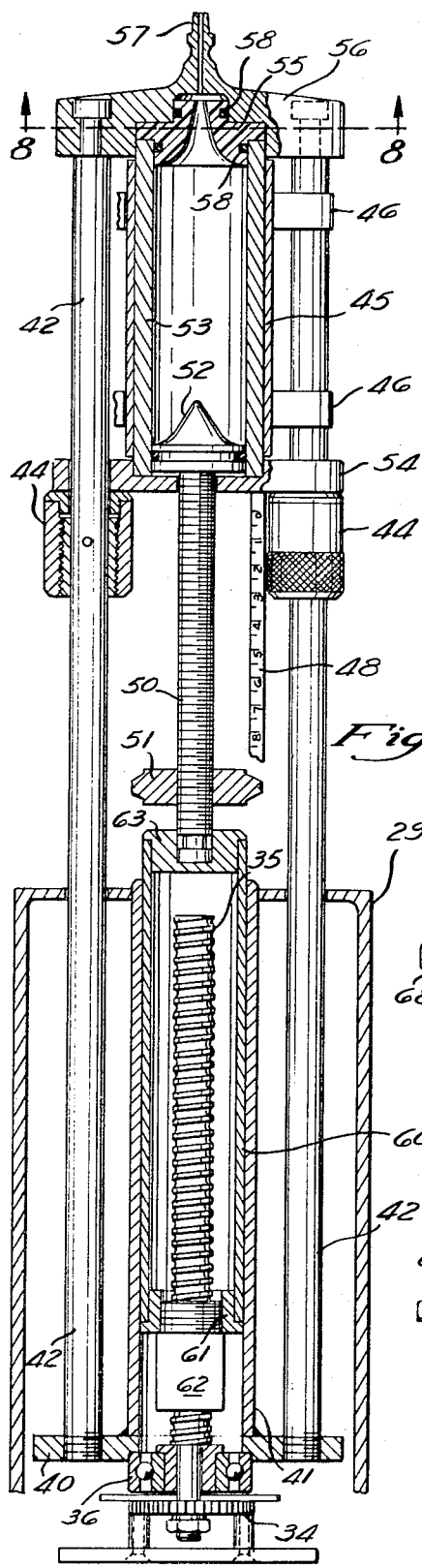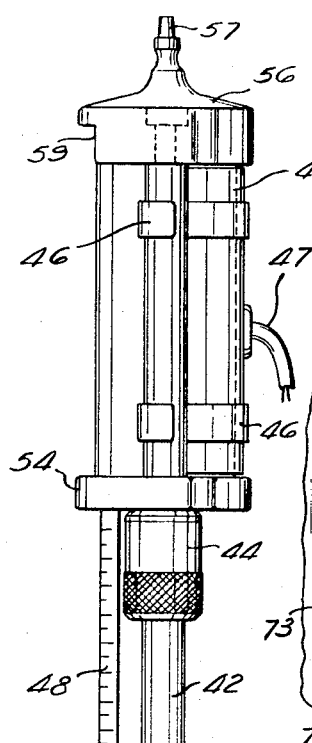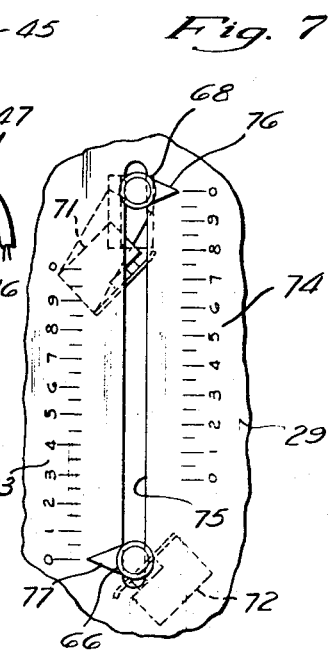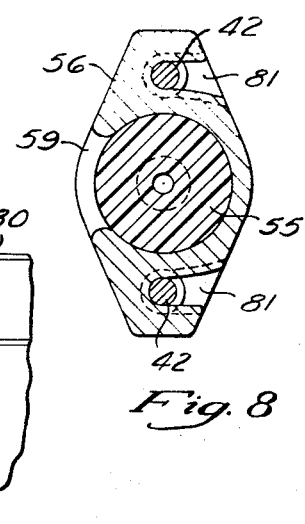

3,631,847

METHOD AND APPARATUS FOR INJECTING FLUID INTO THE VASCULAR SYSTEM

This application is a continuation of my copending application, Ser. No. 531,834, filed Mar. 4, 1966, now abandoned.

BACKGROUND OF THE INVENTION

Heretofore various liquids, including liquids opaque to X-rays, have been injected into the circulatory systems of human beings for the purpose of recording the distribution of the liquid and examining the conditions and changes of conditions in the vascular system from time to time. The apparatus employed heretofore in an effort to accomplish the desired results has not been completely satisfactory so far as I am advised.

THE PRIOR ART

The patents which are known to me and which, when employed, would carry out a method most nearly pertinent to the present invention are the patents to Williamson, U.S. Pat. No. 3,156,236 and to Glass, U.S. Pat. No. 2,627,270.

SUMMARY

The present method and apparatus inventions have been found to be highly satisfactory in contrast with prior methods and apparatus due, primarily, to the ability to control the operating conditions in such a manner as to insure that the injection rates and volumes of injected liquid may be predetermined and accurately repeated time after time and over extended periods of time. The present method has the additional quite desirable result of making it possible to observe, at various times during a long period of time, the progression and regression of a condition peculiar to some particular portion of the vascular system and directly comparing the conditions at different times. Also, the present method makes it possible to observes a locally affected area in the vascular system by delivering the same amount of liquid at the same rate of injection to the same area from time to time. Furthermore, the present method permits the injection of liquids having high viscosities which vary widely under different temperature conditions. Furthermore, the radiopaque liquid is injected by the present method at a controlled rate and in a controlled volume, thereby making it possible to duplicate diagnostic procedures and be able to compare conditions in the patient from time to time.

There are many factors and conditions which are involved in making injections of fluids into the vascular system. For example, none of the prior injectors could be so controlled that, in case the patient was to be exposed to X-rays, the desired amount of liquid opaque to the X-rays would be at the desired location during the desired portion of the cardiac cycle. As a result, X-ray pictures taken of the same patient from time to time were seldom comparable and, hence, the extent of changes would not be noted with certainty.

In other instances where it was desired to observe, over a period of time, the progression and regression of a condition of a particular portion of the vascular system, the prior injectors were incapable of performing in the same way on each occasion and, hence, the results were not directly comparable. In other instances where a locally affected area in the vascular system was to be treated, the prior injectors were incapable of delivering the same amount of liquid to the same area from time to time and, hence, the treatment was somewhat haphazard.

There are several reasons why the prior devices have been incapable of performing as desired including variations in the resistance offered by the equipment including the catheters through which the fluid is passed, variations in the pressure during the injection, variations in the amount of the fluid actually delivered to the desired place in the vascular system and variations in the rate at which the fluid is injected.

The catheters used to conduct the fluid from the injector into the vascular system are prime sources of variable resistance. The catheters vary in length, diameter, materials and internal surface finish, and the flow of fluid through the catheters varies with the variations in the physical configuration of the inlet and outlet ends of the catheters. Moreover, prior injectors have been equipped with various fittings such as stop cocks, check valves, and multiple outlet valves, and the pressure drop through these fittings varies widely. Thus, when all these structural features are taken into account, it is apparent that there is an almost limitless number of combinations of those equipment variables which affect both the volume and the flow rate of the fluid at the discharge end of the catheter.

Variables are also present in the means used to apply the force to the syringe. Some prior devices have used high-pressure bottled gas as a source of energy to actuate the syringe. That gas was passed through a reducing valve to act upon the piston of the syringe. While such a procedure was a great improvement over the old method of having a manually operated syringe, it was quite difficult to control accurately the flow of gas under pressure at various temperatures and flow rates through small orifices and passageways of reducing valves in a very short period of time. There have also been mechanically actuated syringes activated by a metal spring but uncertain variables were present due to spring fatigue or friction, lubrication and even the temperature of the materials. Other efforts used an experimentally compiled data sheet to select a substantially constant torque to be developed by an electric motor connected to a screw thread to move the syringe. That arrangement produced a substantially constant force acting on the syringe but did not deliver the fluid at the precise rate desired. The arrangement also involved equipment which was large and bulky and often was underpowered, thus necessitating resort to a smaller diameter fluid discharge piston, in order to inject at the high pressures required to get a desirable flow. Such bulky equipment has also been restricted in the position in which it could be used in addition to using up premium space close to a patient that must be accessible to doctors and other equipment and apparatus.

Apparatus embodying the present invention avoids the foregoing troubles incident to equipment by including means which can exert any desired pressure on a fluid to inject any predetermined volume of it at any desired rate through any selected catheter or apparatus offering resistance to flow for any duration of time and for injecting predetermined volumes repeatedly throughout predetermined intervals.

BRIEF DESCRIPTION OF THE DRAWINGS

The present invention will be better understood by those skilled in the art from the following specification and the accompanying drawings which form a part thereof and in which:

FIG. 1 is an isometric view of one form of injector embodying the present invention;

FIG. 2 is a fragmentary elevational view, partly in section, of means for raising and lowering the injector on its support post;

FIG. 3 is a side elevation, partly in section, of the syringe assembly, the power cylinder assembly and the motive power assembly of the injector of FIG. 1;

FIG. 4 is an end view taken on line 4—4 of FIG. 3 showing the gear train and the position of the tachometer-generator with respect to the motor;

FIG. 5 is an enlarged partial top view, partly in section, of the syringe assembly and power cylinder assembly of FIG. 3;

FIG. 6 is a fragmentary side elevational view, partly in section, showing details of the volume controls;

FIG. 7 is a fragmentary plan view of parts of FIG. 6;

FIG. 8 is a sectional view taken on line 8—8 of FIG. 5; and

In FIGS. 1 and 2, A indicates the console assembly, B the syringe assembly, C the frame assembly, and D the power cylinder assembly.

Figure 9:
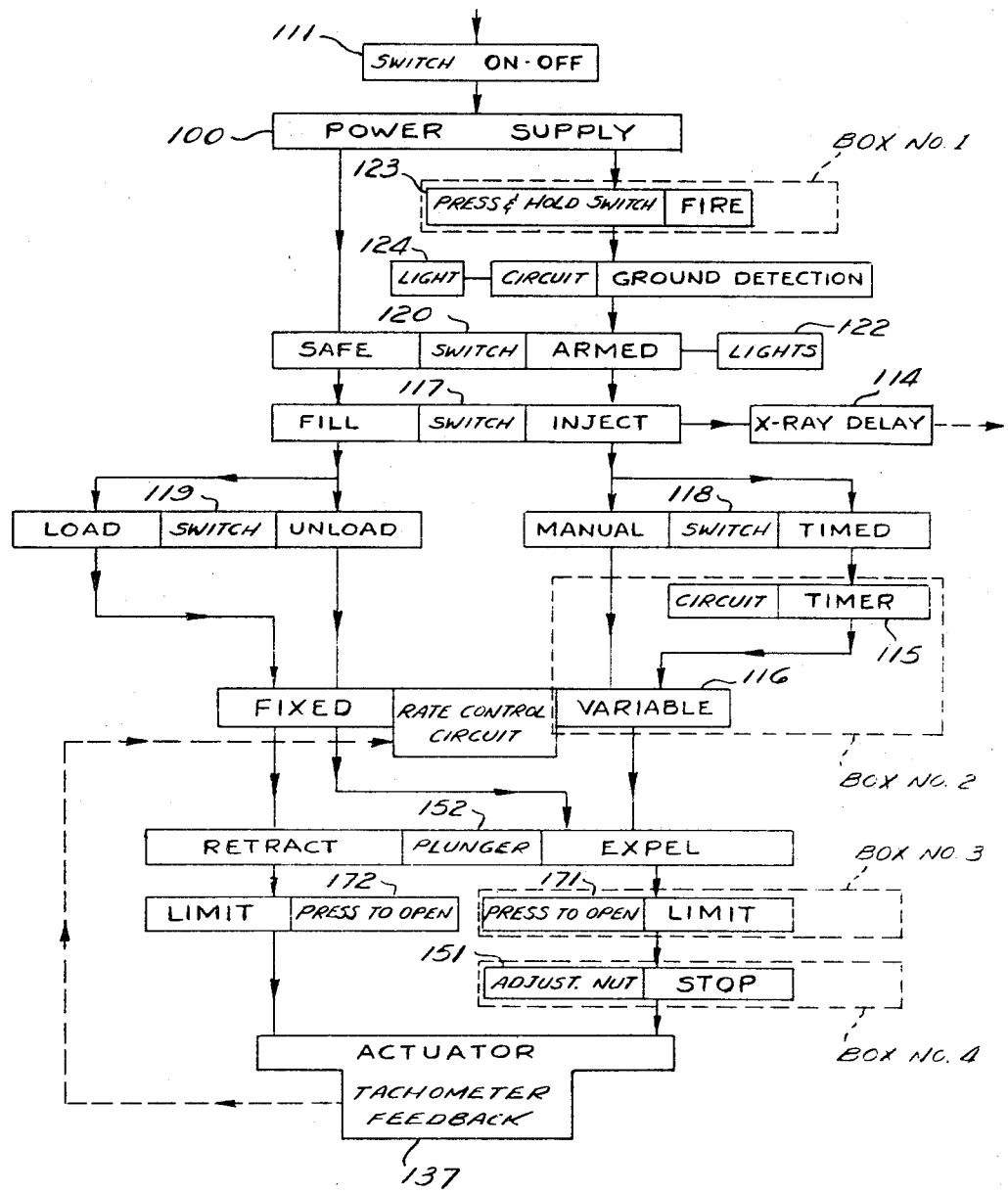
FIG. 9 is a function diagram of the apparatus.

THe console assembly A includes a base 1 mounted on casters (not shown), a post 2 extending up from the base, means including a rack 3 fixed to post 2, a pinion 4 having tooth engagement with the rack, a shaft 5 journaled in pads on the console 10 and a crank 6 secured to shaft 5 for moving the console up and down on post 2.

Control console 10 is a case which houses the electrical wiring and timing and control devices. On its sloping top surface, console 10 carries a powerline switch 11, an indicator light 12, a fuse 13, a time delay dial 14, an injection time dial 15, an injection rate dial 16, a master switch 17, a timed operation switch 18, a switch 20, and indicator lights 22. A remote hand-operated switch is shown at 23, and 24 is an indicator light to indicate the existence of undesirable stray current or difference in electrical potential.

The console assembly includes an arm 25 hinged to the console and swingable in a horizontal plane with a hinge 26 at its free end carrying a tubular arm 27 rotatably carried on a rodlike extension of hinge 26. The arm 27 may be locked in position by clamp handle 28 and is connected to case 29. This case 29 constitutes part of the frame assembly, houses part of the power cylinder assembly and carries the motive power assembly and the syringe assembly.

The operations of the dial, switches and the like above mentioned as being parts of the control console assembly are as follows:

Main switch 11 controls the power supply into the console. Whenever indicator light 12 is on there is electrical power into the console. An easily accessible fuse of suitable size is mounted at 13 to protect the various assemblies of the injector against overloading. Time delay dial 14 controls the period of time, in seconds or fractions thereof, after the initial start of the injection cycle that will elapse before an auxiliary circuit, such as an X-ray control circuit, will be energized. Injection time dial 15 controls the total time of the injection cycle and, for purposes of illustration, may be established between 0.2 second and 4.0 seconds.

Injection rate dial 16 controls the rate of fluid injection in milliliters per second. The rate of discharge from the syringe is determined by the speed of the drive motor. For example, the rate of injection may be varied between 1 milliliter and 60 milliliters per second.

Switch 17 is one of two master switches that must be positioned properly for operation of the apparatus at a preselected rate. During preliminary preparations switch 17 is put in the "-Fill" position while the syringe assembly, described later, either is being filled with fluid or discharging fluid and possibly air. When switch 17 is in the "Fill" position, switch 19 will control the direction of rotation of the motor by either being in the "Load" or "Unload" position and when operating in either direction the motor speed will be at a slow fixed rate. When switch 17 is in the "Inject" position, switch 19 is cut out of the circuit and switch 18 is included in the circuit. Switch 18 may be placed in the "Timed" position to include time delay dial 14, injection time dial 15, and injection rate dial 16 in the circuit. Switch 18 may also be positioned in the "-Manual" position so that only injector rate dial 16 is in the circuit to control the speed of the motor and thus the rate of injection may be preselected while the period of time of injection is not automatically controlled.

Regardless of the position of switch 18 the injection will not begin until the second master switch 20 is placed in the "Armed" position. Thus, both master switch 17 and master switch 20 must be set by the technician before other than very slow injection will occur. When all dials have been set and other preparations completed, switch 20 is placed in the "Armed" position at which time indicator lights 22 on the console and on the case will be on to indicate that all is ready and also as a warning to exercise precautions against accidental injection.

Remote switch 23 is shown as a hand-operated switch although a foot-operated switch might be preferred in some cases. Closing switch 23 will begin the injection at the rate selected by dial 16. If switch 18 is in the "Timed" position, the injection will continue for the time period selected by dial 15 and then stop unless one of the other safety means described later should come into play. If switch 18 is in the "Manual" position, the injection will continue either until remote switch 23 is released or one of the other safety means is used.

For timed operation, switch 18 is set in the "Timed" position, dials 15 and 16 are set, switch 17 is positioned in the "Inject" position, switch 20 is placed in the "Armed" position and immediately indicator lights 22 come on. These lights indicate to the technician that all is ready. When remote switch 23 is closed the injection cycle will begin.

Indicator light 24 indicates the existence of an undesirable stray current or difference in electrical potential in connection with the patient and under such conditions the injection cycle will not begin and, if already underway, then current will be broken and the cycle will be interrupted.

Arm 25, tubular arm 27, and hinge 26 allow case 29 to be moved close to the patient without using premium bedside space for either the console or the operator. In addition, case 29 may be raised or lowered by turning handle 6. Thus, it is possible to position the unit exactly as desired for each use.

Motive power assembly E is shown in FIGS. 3 and 4. Motor 30 is mounted within case 29 shown in partial section. Pinion 31 on the motor shaft engages clutch gear 32 which incorporates a spring loaded clutch normally engaged but one that will slip in the event of an overload. Idler gear 33 acts between clutch gear 32 and drive screw gear 34 mounted on drive screw 35 which is positioned against axial movement by bearing 36. Tachometer-generator 37 is connected to the gear train for a positive drive from motor 30 and generates an electrical signal in proportion to the speed of rotation. The generated signal, as later described, is used to control the speed of motor 30. The slightly offset position of tachometer-generator 37 is more clearly shown in FIG. 4.

Motor 30 is a direct current motor that will have a high starting torque, attain the selected speed very quickly, be accurately controlled at a preselected speed, and may be almost instantaneously stopped by dynamically braking. The motor is large enough to develop whatever power is required to move the plunger 52, later described, at the selected rate.

Shown in FIGS. 5 and 6 and in part in FIG. 3 is the assembled relationship of frame assembly C, syringe assembly B and power cylinder assembly D. Frame assembly C is made up of backplate 40 to which is fastened guide tube 41 and two support rods 42 (also shown in FIG. 1). Bushings 43 are mounted on rods 42 and have screw-threaded connection with nuts 44. Heater 45 is to maintain the injection fluid close to body temperature and is made in form of a half cylindrical saddle to conform to the outer surface of cylinder 53 and is carried by straps 46 which are so formed as to fit over rods 42. Lead wire 47 is connected to the heater. Indicator rod 48 is positioned and supported by case 29 as shown in FIG. 1.

Syringe assembly B includes plunger stem 50 on which is mounted nut 51 in adjustable screw-threaded relationship. Plunger 52 is at one end of stem 50 and is slidable within cylinder 53 (shown in FIG. 1) which is supported at one end in a recess of yoke 54 so formed as to be loosely engaged and supported by rods 42. The other end of cylinder 53 engages cylinder head 55 preferably made of a transparent plastic material and supported by nozzle 56 (also shown in FIG. 1). As will be seen, nozzle 56 is formed to engage shoulders on the ends of rods 42 to limit axial movement and also has a nozzle tip 57 to connect to a fluid conducting catheter 80 shown in FIG. 3. Fluidtight sealing is maintained where needed by use of O-rings 58 of proper dimensions.

Syringe assembly B may be removed from the injector as a unit by loosening nuts 44 and thumb screw 64. The assembly may be sterilized and replaced on support rods 42 as a unit. When this procedure is followed the entire area around nozzle tip 57 that is contacted by the technician while connecting the catheter is clinically clean and sterile and the possibility of contamination of the injection fluid or of the patient is greatly reduced.

Power cylinder assembly D is shown in horizontal section in FIG. 5 and partial elevation section in FIG. 6. Power cylinder 60 is fitted at one end with bushing 61 attached to nut 62. Nut 62 is screw threaded on drive screw 35. The screw thread between nut 62 and drive screw 35 should have a minimum of friction and the ball bearing type of thread has been found to be very satisfactory for this purpose. At the other end of cylinder 60 adapter 63 is connected to and has a recess for one end of plunger stem 50. Thumb screw 64 is threaded into adapter 63 to engage an annular groove in stem 50 and prevent axial movement of the stem out of adapter 63. Indicator pin 65 is connected to bushing 61 and cylinder 60 and extends through an axial slot 75 in guide tube 41. Pin 65 thus prevents rotation of the power cylinder assembly within tube 41 when drive screw 35 is rotating in either direction. Mounted on the outer end of pin 65 is knob 66. Slide post 67 has mounted on its outer end slide knob 68 and is positioned by slide block 69 which engages and slides in groove 75 in guide tube 41. Post block 70 is fastened to slide post 67 under the surface of case 29. Knob 68 may be loosened to allow the post 67 and block 69 to be moved to a desired position along slot 75 and then tightened so as to clamp the knob 68 and block 70 against case 29 for a fixed position. Injection limit switch 71 is mounted on slide block 69 and thus may be moved and positioned axially by means of knob 68. Fill limit switch 72 is mounted on guide tube 41 in a fixed location.

In order to avoid bending and binding of the various parts of the connected assemblies the tension rods 42, plunger stem 50, and nozzle tip 57 are all in the same plane. With this arrangement of parts, the forces developed by drive screw 35 through cylinder 60 to plunger stem 50 and through the fluid against nozzle 56 are resisted by rode 42 in a balanced and symmetrical manner to avoid uneven deflections.

FIG. 7 shows the relationship of injection limit switch 71 and fill limit switch 72 to injection limit scale 73 and injection indicator scale 74 on case 29. The extent and shape of slot 75 in guide tube 41 is also shown clearly in this view. Injection limit pointer 76 is positioned by knob 68 and injection indicator pointer 77 is positioned by knob 66. Limit switch 71 is adjustable along slot 75 by loosening knob 68. The pointer 76 attached to knob 68 is positioned along the indicator scale 74. In operation, when indicator pin 65 advances and trips limit switch 71, the electric power supply will be interrupted to stop the motor 30. When the injector is being filled, post 65 will engage and trip limit switch 72 upon reaching the withdrawn position.

FIG. 8 shows the assembled relationship of the support rods 42, cylinder head 55, and nozzle 56. Also shown is the location of opening 59 with respect to the cylinder head 55. In addition this view shows slots 81 formed to receive the ends of rods 42.

FIG. 9 is a function diagram of the apparatus that shows the operational relationship of the various circuits and switches. If the diagram is used in the manner of the usual flow chart it is possible to trace one of several paths from the main switch 111 to the actuator or motor that drives the injector. FIG. 9 includes many of the parts referred to in FIGS. 1–8 and, for FIG. 9, the reference numbers will be the number of the part previously described and referenced plus 100. Thus main switch 11 of FIG. 1 will be referred to as main switch 111 of the function diagram.

It will be apparent from FIG. 9 that one of two principal functional systems may be used to operate the injector unit. Generally speaking, but not necessarily, one system is used for preparatory procedures and the second system is used for the fluid injection procedure.

The preparatory procedure may be traced down the left-hand side of the diagram. First, main switch 111 is closed to energize the injector console with power supply 100. Master switch 120 is placed in the "Safe" position and master switch 117 is placed in the "Fill" position. It will be apparent that both manually operated switches must be properly positioned before the power supply is connected to and available to operate motor 30 of FIG. 1 and move plunger 52 of FIG. 5. Manual switch 119 controls the direction of rotation of the motor and thus the direction of movement of the plunger in the syringe assembly. In either direction of movement the rate control circuits, described later, that function when using the preparatory system, will maintain a low motor speed so the plunger movement will be at a fixed and low rate of approximately 4 milliliters per second. Whenever switch 119 is in the "Load" position, the movement of the syringe plunger 152 will continue in the "Retract" direction until limit switch 172, of the "Press to open" type, is tripped. Whenever switch 119 is in the "Unload" position, the "Expel" movement will continue until limit switch 171, also a "Press to open" type, is tripped or until adjustable stop nut 151 bumps against part of the syringe assembly and causes the clutch to slip.

When the motor is running and the actuator, comprising the motive power assembly and the power cylinder assembly, is moving the plunger, tachometer-generator 137 generates and sends a feedback signal to the rate control circuit to maintain the desired speed of the motor. The feedback signal is an electrical potential or voltage that is balanced in a conventional manner against a voltage corresponding to the selected motor speed. Any unbalance between the two voltages will result in additional current to the motor if the speed of the motor is low or less current to the motor if the speed is above the desired speed. The injection procedure is traceable down the right-hand side of the diagram and includes the use of remote switch 123 as the final link to control power supply 100. Remote switch 123 is manually operated when all is in order for an injection and is the last switch to be closed in this system. Switch 123 is of the "Press and hold to close" type and thus at any time in the procedure the entire program may be stopped by releasing the pressure on the switch.

Also, as an automatic master control for this system, included is a ground detection and amplification circuit to open a relay and interrupt the power supply in the event of an undesirable difference in electrical potential between the patient and the injector apparatus. When such an interruption happens, indicator light 124 will indicate the existence of the hazard.

After master switch 120 is moved to the "Armed" position, indicator lights 122, shown as light 22 on both the console 10 and the case 20 of FIG. 1, will be lighted as a precautionary warning to the technician. Placing master switch 117 in the "Inject" position will make available X-ray delay timer 114 if it is desired to be used to actuate X-ray apparatus either immediately or after a specified delay after injection starts.

Switch 118 may be placed in the "Manual" position in which case the injection time period will normally be controlled by remote switch 123 or by the later described limit switch 171. When switch 118 is in the "Timed" position, a suitable timer 115 is preset to control the injection period. The rate control circuit may be adjusted by variable rate control 116 to set the speed of the motor and thus the speed of the plunger. The use of the timed circuit with the variable rate determines the volume of fluid injected.

During the injection procedure the plunger, unless stopped by one of the above-mentioned functions, will continue to expel fluid until either limit switch 171, of the "Press to open" type, or adjustable nut 151 stops the plunger.

Throughout the injection procedure tachometer-generator 137 continues to send a feedback signal to be balanced against a signal corresponding to the rate selected and thus maintain the selected actuator speed.

Shown on FIG. 9 are four dash-lined boxes. Each box encloses a functional part or combination of parts that limit the volume of fluid injected. The quadruple duplication of limiting functions provides positive and absolute protection and safety of the patient against an excessive volume of fluid being injected at any one time.

In order to use the injector, cylinder 53 must first be filled with injection fluid. This may be done by tipping the syringe assembly to a vertical or near vertical position with the outlet of nozzle 56 up. Injection fluid is drawn into cylinder 53 by operating motor 30 in a direction to move plunger 41 back into the cylinder. The direction of rotation of the motor is controlled by switch 18 when switch 17 is in the "Fill" position. When the plunger is in the full position, slide post 65 will trip limit switch 72 and stop the motor.

While the nozzle is in an upward position opening 59 in the nozzle next to transparent cylinder head 55 will permit a visual observation of the contained fluid to determine the presence of undesirable air bubbles in the cylinder. If air bubbles are present the cylinder may be tapped lightly to shake the air up and out through the nozzle tip 57 or the plunger may be moved slightly to force the bubbles out. When the cylinder is filled in a satisfactory manner, the catheter 80 may be connected and the necessary steps taken to prepare it for use.

Before the injection procedure is started, stop nut 51 should be positioned on plunger stem 50 to limit mechanically the forward or discharge travel of the plunger stem and attached plunger 52. The stop nut is set so that an annular groove on the edge of the nut is in line with the proper index mark on indicator rod 48. Then, should other limit means fail, stop nut 51 will bump against yoke 54 to prevent further travel of plunger 52 and thereby limit, by mechanical means, the volume of fluid injected. When this happens the spring loaded slip clutch on clutch gear 32 will slip and prevent mechanical damage to the unit.

For manual control of the injection program, switch 18 is moved to the "Manual" position and switch 17 is moved to the "Inject" position. The rate of advancement of plunger 52 and thus the rate of injection is determined by the speed of motor 30 because of the positive mechanical connection through gears and screw threads to plunger 52. Tachometer-generator 37 is connected by suitable wiring through arms 25 and 27 to the console and the electric signal from the tachometer-generator is used through suitable circuits connected to dial 16 to regulate accurately the speed of the motor. Dial 16 is set for the desired injection rate. Switch 20 is placed in the "Armed" position.

After the above settings have been made for manual control, remote switch 23 need only be pressed and held in by the technician. The injection will begin at the rate indicated by dial 16 and continue either as long as switch 23 is held in or until post 65 advances with the power cylinder assembly and trips limit switch 71. When this procedure is followed the volume of fluid injected will be limited by a combination of mechanical and electrical means. If it is preferred not to use limit switch 71, the technician may observe the advancement of pointer 77 along scale 73 and stop the injection at the desired limit by releasing switch 23.

For time control of the injection program, switch 18 is moved to the "Timed" position, switch 17 is moved to the "Inject" position, dial 15 is set for the length of time desired for the injection, dial 16 is set for rate of injection, and switch 20 is moved to the "Armed" position at which time indicator lights 22 will come on. When the technician presses remote switch 23, injection will begin with the plunger 52 advancing at the rate selected by dial 16 and continued until the expiration of the time selected by dial 15. By using this combination of switches and circuits, it is possible to limit, by electrical means, the volume of fluid injected even though remote switch 23 is still closed and even though post 65 may not have tripped limit switch 71. However, if for any reason, at any point while under automatic control, the injection program may be stopped by the technician by releasing switch 23.

Switch 23 is connected to the console by a lead wire of sufficient length to allow the operator to be away from the console, after the necessary switches and dials are positioned, to permit the technician either to be close to the patient for constant surveillance or to be removed from the general area when X-rays are being made.

Because control switch 23 has full control over the operation of the injector, the procedure may be started and stopped at any instant. This precise control over the injection stroke of the plunger allows the technician to use the injector during the insertion of the catheter into the vascular system. By using a fluoroscope and injecting small amounts for short periods of time or "stuttering" of fluids through the catheter, it is possible to follow the progress of the tip of the catheter as it is inserted into the body. Such control over the injection stroke may also be secured by using the rate dial and the time dial set at low range.

The terms "fluid" and "fluids," as used herein with reference to materials which are to be injected into the vascular system and which are opaque to X-rays, mean and include not only liquids of a wide range of viscosities but also gases which are readily absorbed by the blood.

Having thus described this invention in such full, clear, concise and exact terms as to enable any person skilled in the art to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. The method of injecting radiopaque fluids into the vascular system of a human being which comprises the steps of:
   a. placing a quantity of a radiopaque fluid in a syringe having a plunger,
   b. connecting one end of the syringe to a catheter to receive fluid expelled from the syringe,
   c. inserting the other end of the catheter into the vascular system of a human being,
   d. exerting sufficient force on the plunger to expel the fluid through said catheter and inject the fluid into said vascular system, and
   e. maintaining a preselected constant rate of injection by continuously monitoring and maintaining constant the speed of the plunger advance in the syringe during the time of injection of fluid, said monitoring being the result of a signal automatically generated by control means connected to said syringe.

2. The method set out in claim 1 in which said rate is continued for a predetermined period of time.

3. The method set out in claim 1 in which a predetermined volume of the fluid is expelled.

4. The method set out in claim 1 in which the force is repeatedly applied and interrupted so that the flow of the fluid is pulsating.

5. The method set out in claim 1 in which a signal corresponding to the predetermined rate of injection is generated and a feedback signal corresponding to the actual rate of injection is generated and the two signals are maintained in balance.

6. Apparatus for injecting radiopaque fluids into the vascular system of a mammal comprising:
   a. a syringe assembly including a cylinder to contain a radiopaque fluid, a plunger movable endwise therein to expel said fluids,
   b. a frame assembly supporting said syringe assembly,
   c. a power cylinder assembly operatively connected to said frame assembly and to said plunger,
   d. a motive power assembly including a motor operatively connected to said power cylinder assembly for moving said plunger at a constant predetermined speed, and
   e. means operatively connected to said motive power assembly to generate a plunger speed-indicating signal to control the speed of the motor whereby the discharge rate of said fluid is maintained constant independently of fluid pressure variations in the syringe assembly.

7. The combination of elements set forth in claim 6 in which the power cylinder assembly includes a cylinder, a threaded rod in and connected to said cylinder and connected at one end to said motive power assembly.

8. The combination of elements set forth in claim 6 in which a stop nut is adjustably screw threaded on said plunger to limit the endwise movement of said plunger in one direction.

9. The combination of elements in claim 6 in which the frame assembly includes at least two rods on opposite sides of said syringe and having the centerlines thereof parallel to and in the same plane as the centerline of syringe to support the syringe assembly and a nut on each rod to engage and clamp the syringe assembly in place.

10. The combination of elements set forth in claim 6 in which the motive power assembly includes a variable speed direct current motor and means for controlling the speed of the said motor.

11. Apparatus for injecting fluid into a mammular vascular system comprising:
    a. a syringe assembly including a cylinder to contain a fluid to be injected, a plunger therein, and an endwise movable stem connected to said plunger,
    b. a source of electric power,
    c. an electric motor operatively connected to said source and said stem,
    d. means operatively connected to said motor to monitor and control the speed of said motor at a constant preselected speed while injecting said fluid by continuously varying the power supplied to the motor to maintain a predetermined rate of discharge of said fluid,
    e. a manually operated switch to start said motor, and
    f. an automatically operated switch to stop said motor.

12. The combination of elements set forth in claim 11 in which said automatically operated switch is adjustable as to location.

13. The combination of elements set forth in claim 11 in which the said automatically operated switch is a relay switch that opens when an undesirable electrical hazard is detected.

14. The combination of elements set forth in claim 11 in which said manually operated switch is connected to and energizes an auxiliary circuit for apparatus to record the distribution of said fluid in said vascular system.

15. The method of injecting radiopaque liquids into the vascular system of a human being which comprises the steps of
    a. exerting sufficient force on a plunger in a syringe to expel radiopaque liquid from said syringe and into such a vascular system, and
    b. maintaining a predetermined constant rate of injection of the liquid by continuously monitoring the forward speed of the plunger to maintain constant the speed of the plunger advance in the syringe during the time of injection of the liquid, said monitoring being the result of a signal automatically generated by control means connected to said syringe.

16. The method set out in claim 15 in which said rate is continued for a predetermined period of time.

17. The method set out in claim 15 in which a predetermined volume of the liquid is expelled.

18. The method set out in claim 15 in which the force is repeatedly applied and interrupted so that the flow of the fluid is pulsating.

19. The method set out in claim 15 in which a signal corresponding to the predetermined rate of injection is generated and a feedback signal corresponding to the actual rate of injection is generated and the two signals are maintained in balance.

20. The method of injecting radiopaque fluids into the human vascular system which comprises the steps of:
    a. placing a quantity of radiopaque fluid in a motor driven syringe having a plunger,
    b. connecting one end of the syringe to a catheter to receive fluid expelled from the syringe,
    c. inserting the other end of the catheter into the human vascular system,
    d. generating a first signal corresponding to the desired rate of flow of said radiopaque fluid out of said syringe,
    e. generating a feedback signal corresponding to the actual rate of flow of said fluid, and
    f. combining the two said signals, said combination of signals serving to operate the motor of said motor driven syringe so that said radiopaque fluid is injected into the vascular system at a constant rate of flow.

21. The method as in claim 20 wherein said feedback signal is derived by continuously monitoring the forward plunger speed.

22. Apparatus for injecting radiopaque fluids into the vascular system of a mammal comprising:
    a. a syringe assembly including a cylinder to contain a radiopaque fluid, a plunger movable endwise therein to expel said fluids,
    b. a casing assembly supporting said syringe assembly,
    c. a power cylinder assembly operatively connected to said casing assembly and to said plunger,
    d. a motive power assembly including a motor, operatively connected to said power cylinder assembly for moving said plunger at a constant predetermined speed, and
    e. means operatively connected to said power assembly to generate a plunger speed-indicating signal to control the speed of the motor whereby the discharge rate rate of said fluid is maintained constant independently of fluid pressure variations in the syringe assembly.

23. The apparatus as in claim 22 wherein said signal-generating means is a tachometer-generator.

24. Apparatus for injecting fluid into a mammular vascular system comprising:
    a. a syringe assembly including a cylinder to contain a fluid to be injected, a plunger therein, and an endwise movable stem connected to the plunger,
    b. an electric motor operatively connected to said stem and adapted to be connected to a source of electricity,
    c. means operatively connected to said motor to monitor and control the speed of said motor at a constant preselected speed while injecting said fluid by continuously varying the power supplied to the motor to maintain a predetermined rate of discharge of said fluid, and
    d. means operatively connected to the motor to automatically terminate the injection when a condition dangerous to the patient exist within said apparatus.

* * * * *